United States Patent
Behravan et al.

(10) Patent No.: US 12,335,040 B2
(45) Date of Patent: Jun. 17, 2025

(54) MODIFICATION OF UPLINK (UL) DATA TRANSMISSION WITH REPETITION IN RESPONSE TO PREEMPTION INDICATION

(71) Applicant: Telefonaktiebolaget LM Ericsson (PUBL), Stockholm (SE)

(72) Inventors: Ali Behravan, Stockholm (SE); Alexey Shapin, Luleå (SE); Mattias Andersson, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 128 days.

(21) Appl. No.: 17/766,795

(22) PCT Filed: Oct. 7, 2020

(86) PCT No.: PCT/IB2020/059427
§ 371 (c)(1),
(2) Date: Apr. 6, 2022

(87) PCT Pub. No.: WO2021/070088
PCT Pub. Date: Apr. 15, 2021

(65) Prior Publication Data
US 2024/0072936 A1    Feb. 29, 2024

Related U.S. Application Data

(60) Provisional application No. 62/911,925, filed on Oct. 7, 2019.

(51) Int. Cl.
*H04L 1/08* (2006.01)
*H04L 1/1812* (2023.01)

(52) U.S. Cl.
CPC .............. *H04L 1/08* (2013.01); *H04L 1/1819* (2013.01)

(58) Field of Classification Search
None
See application file for complete search history.

(56) References Cited

U.S. PATENT DOCUMENTS 10,827,541 B2 * 11/2020 Park ...................... H04L 1/1819
2020/0229202 A1 * 7/2020 Bagheri .............. H04L 25/0226
(Continued)

OTHER PUBLICATIONS

3GPP TS 38.213 v15.7.0; Technical Specification; 3rd Generation Partnership Project; Technical Specification Group Radio Access Network; NR; Physical layer procedures for control (Release 15)—Sep. 2019.
(Continued)

*Primary Examiner* — Kodzovi Acolatse
(74) *Attorney, Agent, or Firm* — Baker Botts L.L.P.

(57) ABSTRACT

Modification of uplink (UL) data transmission with repetition in response to preemption indication is disclosed herein. In one embodiment, a wireless device modifies UL data transmission with repetition responsive to receiving a preemption indication. The wireless device begins a UL data transmission comprising a plurality of repetitions of a data transmission, wherein at least two (2) repetitions are associated with different Redundancy Version (RV) values. The wireless device receives a first preemption indication during a first repetition of the plurality of repetitions, wherein the first repetition is associated with a RV value of X, and X is a positive integer. The wireless device then retransmits the first repetition of the UL data transmission reusing the RV value of X. In some embodiments, after receiving the first preemption indication, the wireless device may cancel the UL data transmission if a code rate of the UL data transmission exceeds a threshold rate.

10 Claims, 12 Drawing Sheets

(56) References Cited

U.S. PATENT DOCUMENTS

| | | | | |
|---|---|---|---|---|
| 2020/0260391 A1* | 8/2020 | Zhou | ....................... | H04L 1/189 |
| 2020/0260474 A1* | 8/2020 | Shapin | .............. | H04W 28/0278 |
| 2020/0267756 A1* | 8/2020 | Fakoorian | ........... | H04W 56/001 |
| 2021/0144750 A1* | 5/2021 | Cao | ................... | H04W 72/0453 |
| 2021/0345366 A1* | 11/2021 | Ying | ................. | H04W 72/0453 |
| 2021/0352678 A1* | 11/2021 | Taherzadeh Boroujeni | ................ | |
| | | | | H04W 72/1268 |
| 2022/0217768 A1* | 7/2022 | Liu | ....................... | H04L 5/0094 |
| 2022/0263635 A1* | 8/2022 | Li | ....................... | H04W 72/569 |
| 2022/0353711 A1* | 11/2022 | Ying | ................. | H04W 72/1263 |

OTHER PUBLICATIONS

PCT International Search Report and PCT Written Opinion of the International Searching Authority issued for International application No. PCT/IB2020/059427—Jan. 21, 2021.

3GPP TSG RAN WG1 Meeting #92bis; Sanya, China; Source: Sony; Title: Considerations on UL pre-emption (R1-1804600)—Apr. 16-20, 2018.

3GPP TSG-RAN WG1 #92b; Sanya, China; Source: Qualcomm Incorporated; Title: eMBB and URLLC dynamic multiplexing and preemption indication on the uplink (R1-1804820)—Apr. 16-Apr. 20, 2018.

\* cited by examiner

| 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|---|---|---|---|---|---|---|---|---|---|---|
| RV=0 | | | | | | | | | | | | | | RV=2 | | | | | | | | | | | | | |

| 0 | 1 | 2 | 3 | 4 | 5 | 6 | 7 | 8 | 9 | 10 | 11 | 12 | 13 |
|---|---|---|---|---|---|---|---|---|---|---|---|---|---|
| | | | | | | | | | | | | | RV=3 |

UL TRANSMISSION WITHOUT PREEMPTION INDICATION

FIG. 4

| 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|---|---|---|---|---|---|---|---|---|---|---|
| RV=0 | | | | | | | URLLC | | | | | | | RV=0 | | | | | | | | | | | | | |

URLLC PREEMPTS EMBB

EMBB STOPS TRANSMITTING

| 0 | 1 | 2 | 3 | 4 | 5 | 6 | 7 | 8 | 9 | 10 | 11 | 12 | 13 |
|---|---|---|---|---|---|---|---|---|---|---|---|---|---|
| | | | | | | | | | | | | | RV=2 |

UL TRANSMISSION WITH A PREEMPTION INDICATION

FIG. 5

FIG. 8 UL TRANSMISSION WITH LOW MODULATION AND CODE RATE

FIG. 9 UL TRANSMISSION WITH HIGH MODULATION AND CODE RATE

FIG. 10 PREEMPTION AT BEGINNING OF REPETITION 2: TRANSMIT REMAINDER OF REPETITION 2 ANYWAY

MODIFICATION OF UPLINK (UL) DATA TRANSMISSION WITH REPETITION IN RESPONSE TO PREEMPTION INDICATION

PRIORITY

This nonprovisional application is a U.S. National Stage Filing under 35 U.S.C. § 371 of International Patent Application Serial No. PCT/IB2020/059427 filed Oct. 7, 2020 and entitled "MODIFICATION OF UPLINK (UL) DATA TRANSMISSION WITH REPETITION IN RESPONSE TO PREEMPTION INDICATION" which claims priority to U.S. Provisional Patent Application No. 62/911,925 filed Oct. 7, 2019 both of which are hereby incorporated by reference in their entirety.

TECHNICAL FIELD

The present disclosure relates to uplink (UL) data transmission in a cellular communication system.

BACKGROUND

Ultra-reliable and low latency communication (URLLC) is one of the main use cases of Fifth Generation (5G) New Radio (NR). URLLC has strict requirements on transmission reliability and latency, i.e., up to 99.9999% reliability and 1 ms one-way latency. In NR Release (Rel-15), several new features and enhancements were introduced to support these requirements. In NR Release 16 (Rel-16), standardization works are focused on further enhancing URLLC system performance as well as ensuring reliable and efficient coexistent of URLLC and other NR use cases. One example scenario is when both enhanced mobile broadband (eMBB) and URLLC User Equipment (UE) co-exist in the same cell. Here, mainly two approaches have been identified to support multiplexing/prioritization:

Power Control. The first method is based on power control to increase the power of the URLLC to make it more resilient to interference from the eMBB user(s). Power control for Rel-15 UEs are specified in Third Generation Partnership Project (3GPP) Technical Specification (TS) 38.213, section 7.1.1. The main advantage with this option is that it does not require any changes in the behavior of the eMBB UE; hence it works with Rel-15 UEs. One disadvantage is that, to guarantee the performance of the URLLC UE while being interfered with by eMBB traffic, its transmit Power Spectral Density (PSD) may have to be increased significantly. But, for example, UEs not in the close vicinity of the base station may not have the power budget to do this increase and will therefore experience much lower Signal to Interference and Noise Ratio (SINR) than the required.

Preemption Indicator. The second method is based on a preemption indicator being transmitted from the base station to the interfering eMBB UEs. When a URLLC UE is scheduled on time/frequency resources that are already scheduled to a lower priority eMBB UE, the base station can transmit a preemption indicator to the eMBB UE. Upon reception of this indicator, the eMBB UE will avoid transmitting on a set of preconfigured resources. The details of the preemption indicator and the UE behavior upon reception of this signal have not yet been specified by 3GPP.

A typical use case for this is where eMBB traffic is scheduled in a whole slot over all physical resource blocks (PRBs), but a time sensitive URLLC needs to be transmitted. Here, "time sensitive" means that it requires instant access to the channel, and waiting until the next available resources will introduce too much delay. In NR, URLLC traffic may be scheduled on one or a few orthogonal frequency-division multiplexing (OFDM) symbols and with a significantly shorter time from the uplink grant to when the uplink transmission takes place. This means that eMBB users may already have been scheduled on all available time/frequency resources. With the preemption indicator, an NR base station (gNB) can preempt the eMBB traffic and hence reduce the interference to the URLLC UE.

Throughout the following description we may use preemption indication (PI), cancellation indication (CI), or UL preemption signal to refer to the same concept explained above.

SUMMARY

Methods and systems are disclosed herein for modifying uplink (UL) data transmission with repetition in response to receiving a preemption indication. Embodiments of a method, performed by a wireless device, for modifying UL data transmission with repetition in response to receiving a preemption indication are disclosed herein. In some embodiments, the method comprises beginning a UL data transmission comprising a plurality of repetitions of a data transmission, wherein at least two (2) repetitions are associated with different Redundancy Version (RV) values. The method further comprises receiving a first preemption indication during a first repetition of the plurality of repetitions, wherein the first repetition is associated with a RV value of X, and X is a positive integer. The method also comprises retransmitting the first repetition of the UL data transmission reusing the RV value of X.

In some embodiments, the method further comprises receiving a second preemption indication during a second repetition of the plurality of repetitions, wherein the second repetition is associated with the RV value of X. The method also comprises determining that the first repetition of the UL data transmission and the second repetition of the UL data transmission do not exceed a predefined percentage of a repetition associated with the RV. The method additionally comprises, responsive to the determining, retransmitting the UL data transmission reusing the RV value of X. Some embodiments may provide that the method further comprises determining that the first repetition was pre-empted from its beginning, wherein retransmitting the first repetition of the UL data transmission comprises retransmitting the first repetition of the UL data transmission reusing the RV value of X starting from a first granted but not pre-empted symbol, responsive to the determining.

Embodiments of a wireless device are also disclosed herein. In some embodiments, the wireless device is adapted to begin a UL data transmission comprising a plurality of repetitions of a data transmission, wherein at least two (2) repetitions are associated with different RV values. The wireless device is further adapted to receive a first preemption indication during a first repetition of the plurality of repetitions, wherein the first repetition is associated with a RV value of X, and X is a positive integer. The wireless device is also adapted to retransmit the first repetition of the UL data transmission reusing the RV value of X. According to some embodiments, the wireless device is further adapted to perform any of the steps attributed to the wireless device in the above-disclosed methods.

Embodiments of a wireless device are also disclosed herein. In some embodiments, the wireless device comprises one or more transmitters, one or more receivers, and processing circuitry associated with the one or more transmitters and the one or more receivers. The processing circuitry is configured to cause the wireless device to begin a UL data transmission comprising a plurality of repetitions of a data transmission, wherein at least two (2) repetitions are associated with different RV values. The processing circuitry is further configured to cause the wireless device to receive a first preemption indication during a first repetition of the plurality of repetitions, wherein the first repetition is associated with a RV value of X, and X is a positive integer. The processing circuitry is also configured to cause the wireless device to retransmit the first repetition of the UL data transmission reusing the RV value of X. According to some embodiments, the wireless device is further adapted to perform any of the steps attributed to the wireless device in the above-disclosed methods.

Embodiments of a method, performed by a wireless device, for modifying UL data transmission with repetition in response to receiving a preemption indication are also disclosed herein. In some embodiments, the method comprises beginning a UL data transmission comprising a first plurality of repetitions of a first data transmission, wherein at least two (2) repetitions are associated with different RV values. The method further comprises receiving a first preemption indication during a first repetition of the first plurality of repetitions, wherein the first repetition is associated with a RV value of X, and X is a positive integer. The method also comprises determining a code rate of the first data transmission. The method additionally comprises determining that the code rate of the first data transmission exceeds a threshold rate. The method further comprises, responsive to determining that the code rate of the first data transmission exceeds the threshold rate, cancelling the first data transmission.

In some embodiments, the method further comprises beginning a UL data transmission comprising a second plurality of repetitions of a second data transmission, wherein at least two (2) repetitions are associated with different RV values. The method also comprises receiving a second preemption indication during a second repetition of the second plurality of repetitions, wherein the second repetition is associated with a RV value of X and X is a positive integer. The method additionally comprises determining a code rate of the second data transmission. The method further comprises determining that the code rate of the second data transmission does not exceed the threshold rate. The method also comprises, responsive to determining that the code rate of the second data transmission does not exceed the threshold rate, continuing transmitting the second plurality of repetitions using an RV value of X+1.

Embodiments of a wireless device are also disclosed herein. In some embodiments, the wireless device is adapted to begin a UL data transmission comprising a first plurality of repetitions of a first data transmission, wherein at least two (2) repetitions are associated with different RV values. The wireless device is further adapted to receive a first preemption indication during a first repetition of the first plurality of repetitions, wherein the first repetition is associated with a RV value of X and X is a positive integer. The wireless device is also adapted to determine a code rate of the first data transmission. The wireless device is additionally adapted to determine that the code rate of the first data transmission exceeds a threshold rate. The wireless device is further adapted to, responsive to determining that the code rate of the first data transmission exceeds the threshold rate, cancel the first data transmission. According to some embodiments, the wireless device is further adapted to perform any of the steps attributed to the wireless device in the above-disclosed methods.

Embodiments of a wireless device are also disclosed herein. In some embodiments, the wireless device comprises one or more transmitters, one or more receivers, and processing circuitry associated with the one or more transmitters and the one or more receivers. The processing circuitry is configured to cause the wireless device to begin a UL data transmission comprising a first plurality of repetitions of a first data transmission, wherein at least two (2) repetitions are associated with different RV values. The processing circuitry is further configured to cause the wireless device to receive a first preemption indication during a first repetition of the first plurality of repetitions, wherein the first repetition is associated with a RV value of X and X is a positive integer. The processing circuitry is also configured to cause the wireless device to determine a code rate of the first data transmission. The processing circuitry is additionally configured to cause the wireless device to determine that the code rate of the first data transmission exceeds a threshold rate. The processing circuitry is further configured to cause the wireless device to, responsive to determining that the code rate of the first data transmission exceeds the threshold rate, cancel the first data transmission. According to some embodiments, the wireless device is further adapted to perform any of the steps attributed to the wireless device in the above-disclosed methods.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 illustrates an exemplary uplink (UL) transmission without a preemption indication, according to some embodiments of the present disclosure;

FIG. 5 illustrates an exemplary UL transmission with a preemption indication, according to some embodiments of the present disclosure;

FIG. 8 illustrates an exemplary UL transmission with low modulation and code rate, according to some embodiments of the present disclosure;

FIG. 9 illustrates an exemplary UL transmission with high modulation and code rate, according to some embodiments of the present disclosure;

FIG. 10 illustrates results of preemption at the beginning of a second repetition, in which a remainder of the second repetition is transmitted anyway, according to some embodiments of the present disclosure;

DETAILED DESCRIPTION

Figure 1:
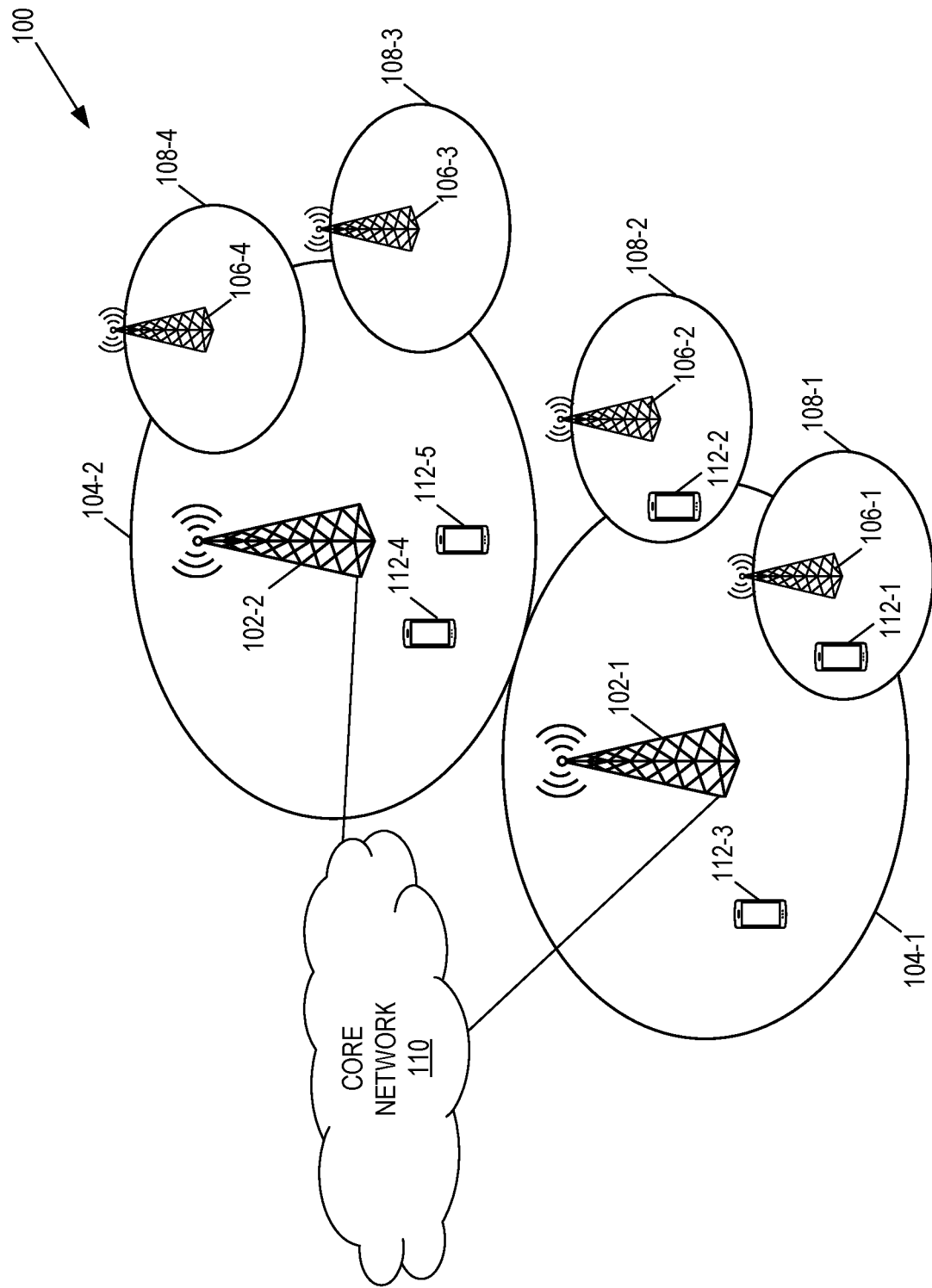
FIG. 1 illustrates one example of a cellular communications network according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) with respect to handling of uplink (UL) preemption indications by UEs. Upon receiving a UL preemption indication, a first UE stops the ongoing transmission to make resources available for a second UE to transmit UL data (i.e., the second UE preempts or punctures the first UE). When the transmission from the second UE is finished, the first UE may or may not resume its transmission. In conventional systems, when the UE resumes a transmission, if a large part of the data has been preempted it is likely that decoding based on the remaining part of the data will fail, in part because a UE that normally transmits N number of copies of a transmission—i.e., the redundancy version (RV) for that transmission is N, where N is a positive integer—will have transmitted less than N full copies of the transmission because at least one of those redundant copies was preempted by the transmission from the second UE.

Certain aspects of the present disclosure and their embodiments may provide solutions to the challenges discussed above. The present disclosure describes methods and systems for modifying UL data transmission with repetition in response to receiving a preemption indication. The present disclosure recognizes that if the UL is repeated, then the repetition can continue later, and it might be possible to decode the data successfully, based on the remaining copies of the repeated transmissions.

Thus, more specifically the method includes (a) changing the redundancy version of the repetitions after resuming interrupted transmission; and/or (b) cancelling the repetitions based on the used code rate (e.g., the Modulation and Coding Scheme (MCS)).

There are, proposed herein, various embodiments which address one or more of the issues disclosed herein. Certain embodiments may provide one or more of the following technical advantage(s). The solution allows more efficient transmission of UL transmission in terms of (a) resource efficiency by resuming the transmission when the resources becomes available instead of not sending the data and leaving those resources empty, and (b) reducing latency by sending the UL data when the resources are available instead of waiting for a reschedule.

FIG. 1 illustrates one example of a cellular communications system 100 in which embodiments of the present disclosure may be implemented. In the embodiments described herein, the cellular communications system 100 is a 5G system (5GS) including a New Radio (eEvolved Universal Terrestrial Radio Access (E-UTRA) Radio Access Network (RAN)). In this example, the RAN includes base stations 102-1 and 102-2, which in 5G NR are referred to as NR base stations (gNBs) (e.g., LTE RAN nodes connected to 5G Core (5GC), which are referred to as gn-eNBs), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
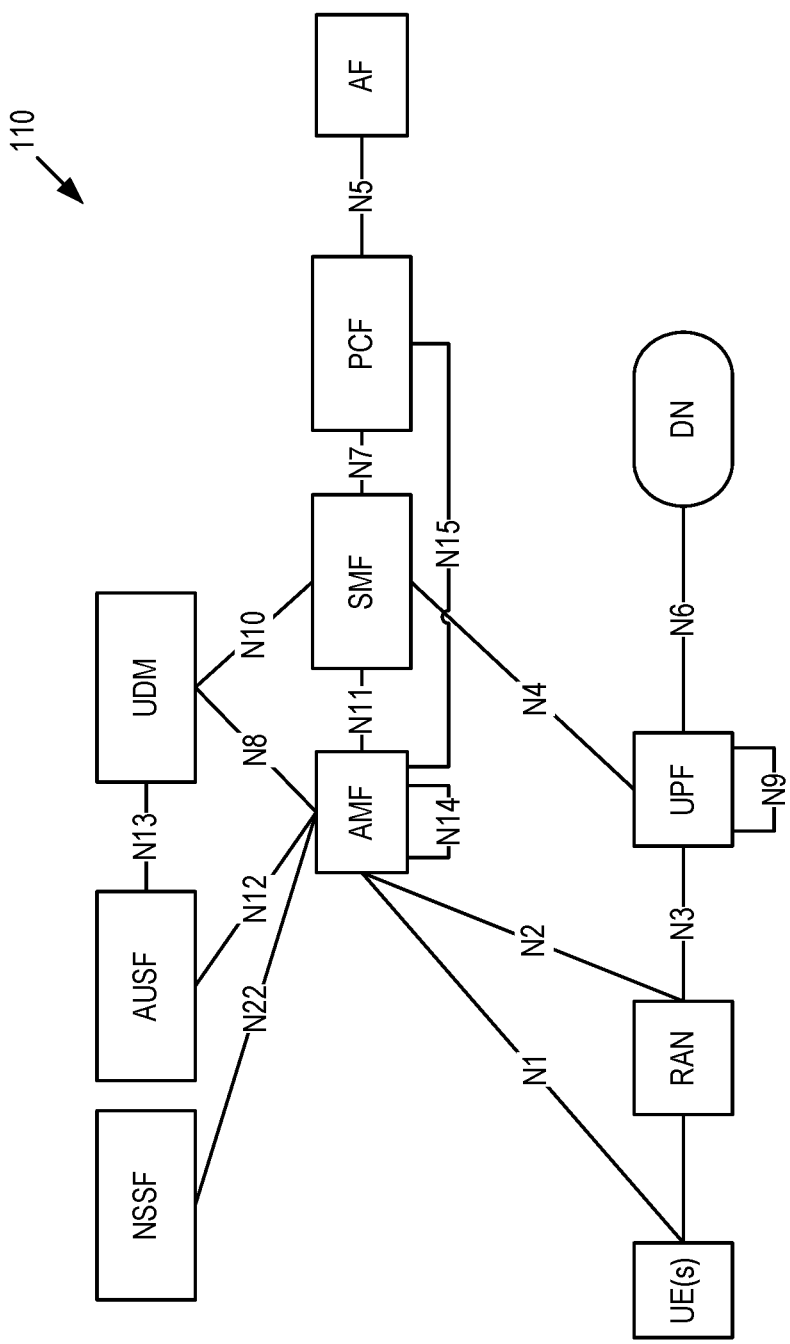
FIG. 2 illustrates a wireless communication system represented as a Fifth Generation (5G) network architecture composed of core Network Functions (NFs), where interaction between any two NFs is represented by a point-to-point reference point/interface.

FIG. 2 illustrates a wireless communication system represented as a 5G network architecture composed of core NFs, where interaction between any two NFs is represented by a point-to-point reference point/interface. FIG. 2 can be viewed as one particular implementation of the system 100 of FIG. 1.

Seen from the access side, the 5G network architecture shown in FIG. 2 comprises a plurality of (UEs connected to either a RAN or an Access Network (AN) as well as an AMF. Typically, the RAN comprises base stations, e.g. such as eNBs or gNBs or similar. Seen from the core network side, the 5G core NFs shown in FIG. 2, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
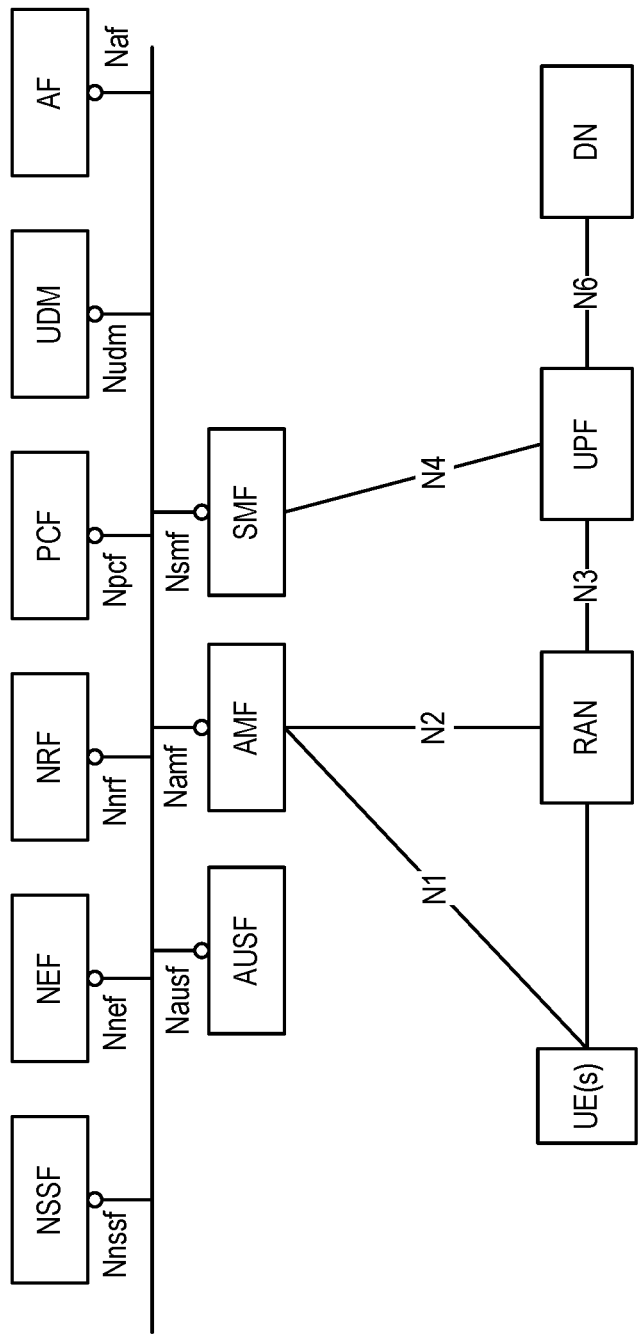
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3, the service-based interfaces are indicated by the letter "N" followed by the name of the NF, e.g., Namf for the service-based interface of the AMF and Nsmf for the service-based interface of the SMF etc. The NEF and the NRF in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Methods for cancelling UL data transmission with repetition based on receiving a cancellation indication are herein provided. According to one method of the present disclosure, the redundancy versions are restarted after resuming an interrupted transmission. This enhances the probability of a successful decoding of the interrupted transmission by the gNB.

FIG. 4 illustrates an exemplary method for modifying UL data transmission with repetition in response to receiving a preemption indication according to some embodiments of the present disclosure. FIG. 4 shows as an example of a slot-length UL transmission with 3 repetitions (transmitted three times) with different redundancy versions 0, 2, and 3.

FIG. 5 illustrates an exemplary method for modifying UL data transmission with repetition in response to receiving a preemption indication according to some embodiments of the present disclosure. FIG. 5 shows an example of the UL transmission of FIG. 4 in which a preemption indication is received by the UE. When the UE receives the preemption indicator, the UE stops the transmission in the current slot. In the next slot, the UE resumes with repetition, but reuses the RV from the previous repetition that was preempted (also referred to herein as a "retry"), and the next repetitions will follow accordingly. The same principle applies to cases where the first repetition is not preempted but instead later repetitions are preempted, e.g., if RV=2 is preempted, then the transmitter repeats RV=2 and continues according to the pre-defined sequence.

Figure 6:
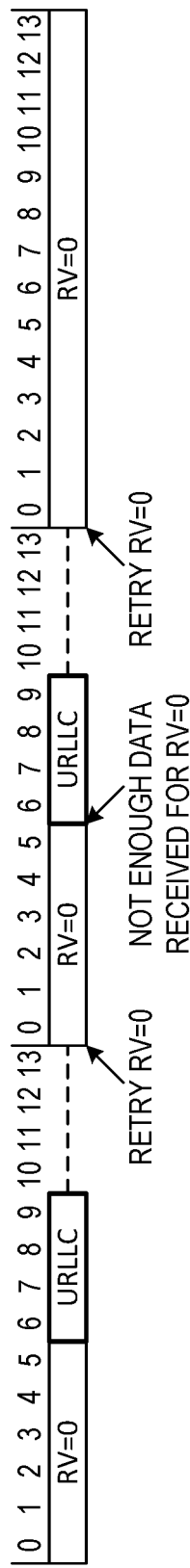
FIG. 6 illustrates an exemplary UL transmission with two (2) preemption indications, according to some embodiments of the present disclosure.
Figure 7:
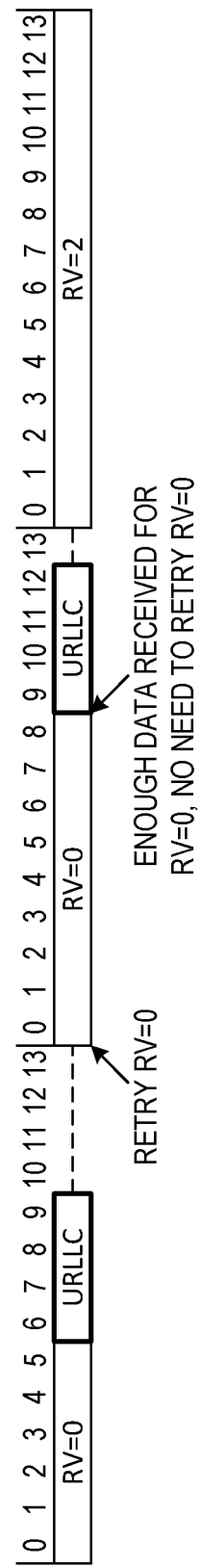
FIG. 7 illustrates an exemplary UL transmission with two (2) preemption indications without a Redundancy Version (RV) sequence entry, according to some embodiments of the present disclosure.

FIGS. 6 and 7 illustrate exemplary methods for modifying UL data transmission with repetition in response to receiving a preemption indication according to some embodiments of the present disclosure, in which the retried repetition is also interrupted. Possible approaches include (a) always retry, and (b) retry only if certain conditions are satisfied.

In the embodiment illustrated in FIG. 6, the first transmission (RV=0) is interrupted, and so the transmitter retries RV=0, which is also interrupted. In the example illustrated in FIG. 6, the system retries RV=0 a third time, either because the transmitter uses an "always retry" approach, or because certain conditions were satisfied, e.g., the second retry was interrupted before enough redundancy data was received by the receiver.

In the embodiment illustrated in FIG. 7, the transmitter will retry only if certain conditions are satisfied, e.g., where the partially transmitted redundancy version of the first interrupted transmission and partially transmitted redundancy version of the second interrupted transmission comprise less than all (100%) or some portion of (e.g. 90%) of redundancy version. In the example illustrated in FIG. 7, the second attempt at transmitting RV=0 is also interrupted by another URLLC transmission, but in this case enough data was retransmitted that in the next transmission, RV=2.

The same concepts may be applied to Physical Uplink Shared Channel (PUSCH) segmentation as well as to non-slot (mini-slot) PUSCH repetition.

FIGS. 8 and 9 illustrate exemplary methods for modifying UL data transmission with repetition in response to receiving a preemption indication according to some embodiments of the present disclosure, wherein when one or some of the transmissions in a series of repetitive transmissions is/are cancelled, the transmissions may resume based on the used code rate or MCS. For example, if the code rate is below a certain threshold which means that the gNB can decode the transmission with a higher probability, the repetitions resume later. Otherwise, if the code rate is above the threshold, which means that it is not likely that the gNB can decode the transmissions successfully, the transmission of repetition will not resume later. FIGS. 8 and 9 illustrate examples where a slot-length UL transmission with 3 repetitions with different RVs 0, 2, and 3 is scheduled, but a preemption indication is received by the UE to stop the transmission in the middle of the first slot.

In the embodiment illustrated in FIG. 8, the original transmission has low code rate, and so the transmission resumes after the preempted repetition, e.g., by transmitting repetition 2, repetition 3, and so on.

In the embodiment illustrated in FIG. 9, the original transmission has high rate, and so the transmission does not resume after the preempted transmission.

FIG. 10 illustrates an exemplary method for modifying UL data transmission with repetition in response to receiving a preemption indication according to some embodiments of the present disclosure, where, if one of the repetitions has been pre-empted from the beginning, it can be started from the first granted, but not pre-empted symbol. As a consequence, not all generated bits for repetition 2 will be transmitted.

Figure 11:
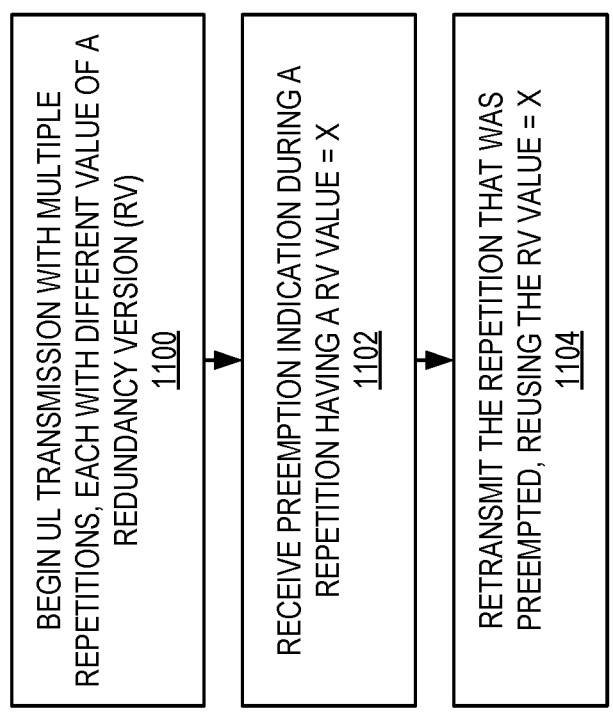
FIG. 11 is a flow chart illustrating an exemplary method for modifying UL data transmission with repetition in response to receiving a preemption indication according to some embodiments of the present disclosure.

FIG. 11 is a flow chart illustrating an exemplary method for modifying UL data transmission with repetition in response to receiving a preemption indication according to some embodiments of the present disclosure. In the embodiment illustrated in FIG. 11, a wireless device begins an UL data transmission with multiple repetitions. In the embodiment illustrated in FIG. 11, each repetition has a different RV value (step 1100), but the same concepts may be applied to scenarios in which an RV value is not used or where a different repetition indicator is used. The wireless device receives a preemption indication during one of the repetitions, e.g., having an RV value="X" (step 1102). In response, the wireless device retransmits the repetition that was preempted, reusing the RV value of X (step 1104).

Figure 12:
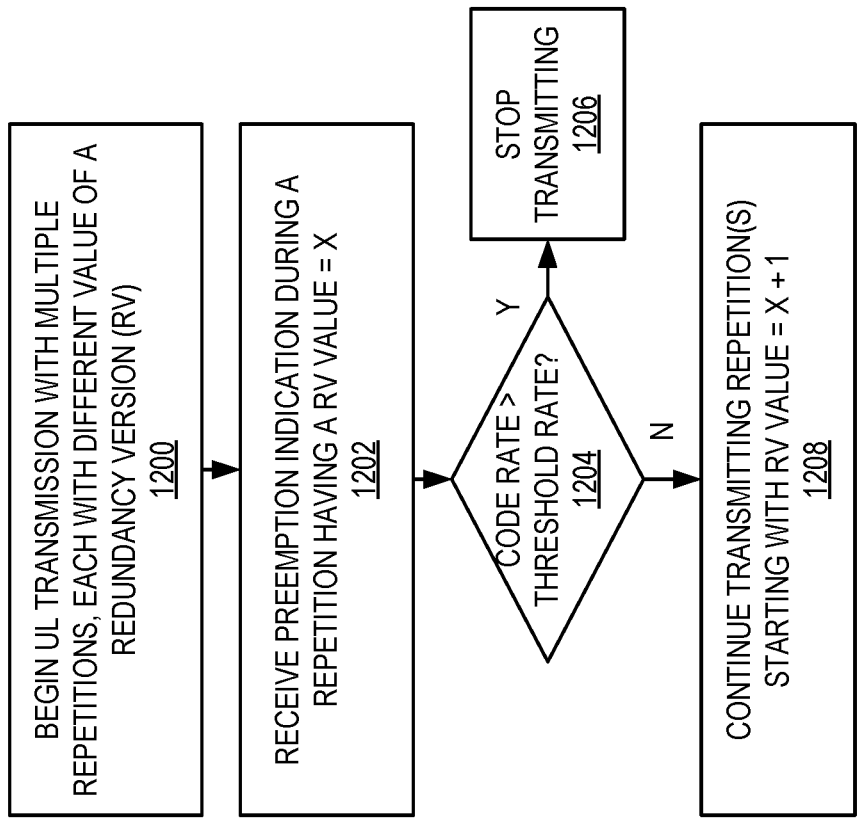
FIG. 12 is a flow chart illustrating an exemplary method for modifying UL data transmission with repetition in response to receiving a preemption indication according to some embodiments of the present disclosure.

FIG. 12 is a flow chart illustrating an exemplary method for modifying UL data transmission with repetition in response to receiving a preemption indication according to some embodiments of the present disclosure. In the embodiment illustrated in FIG. 12, a wireless device begins a UL data transmission with multiple repetitions, each repetition having a different RV value (step 1200), but the same concepts may be applied to scenarios in which an RV value is not used or where a different repetition indicator is used. The wireless device receives a preemption indication during one of the repetitions, e.g., having an RV value="X" (step 1202). In response, the wireless device determines or checks the code rate (step 1204). If the code rate is above the threshold rate, the wireless device ends the transmission (step 1206); otherwise, the wireless device continues transmitting the repetitions using the next value, e.g., using an RV value=X+1 (step 1208).

Figure 13:
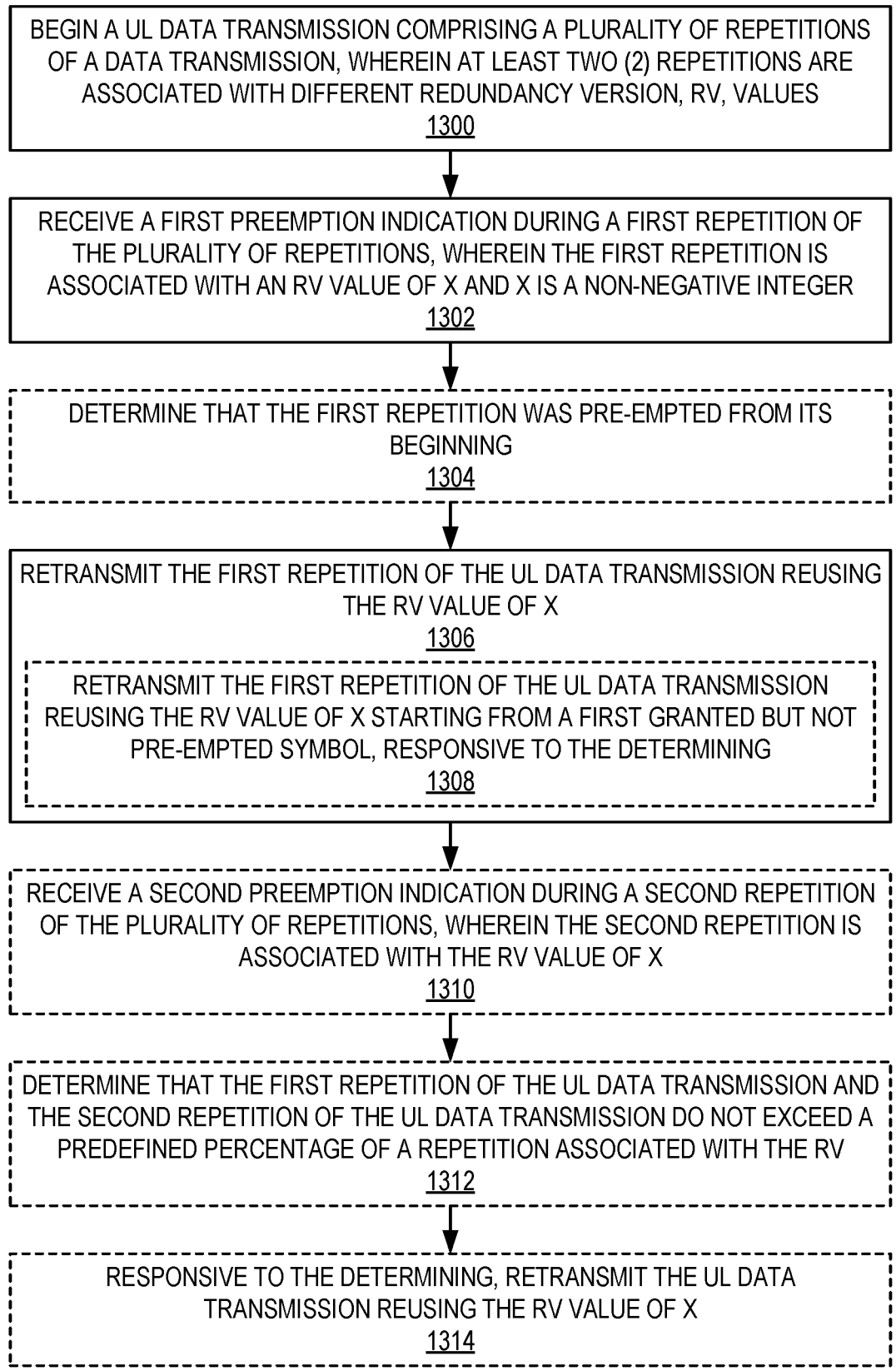
FIG. 13 is a flowchart illustrating exemplary operations for modifying UL data transmission with repetition in response to receiving a preemption indication according to some embodiments of the present disclosure.

FIG. 13 is a flow chart illustrating a more detailed exemplary method for modifying UL data transmission with repetition in response to receiving a preemption indication according to some embodiments of the present disclosure. It is to be understood that the operations illustrated in FIG. 13 correspond to the operations described above with respect to FIG. 11, as well as the embodiments illustrated in FIGS. 5-7 and 10. In embodiments according to FIG. 13, a wireless device begins UL data transmission comprising a plurality of repetitions of a data transmission, wherein at least two (2) repetitions are associated with different RV values (block 1300). The wireless device next receives a first preemption indication during a first repetition of the plurality of repetitions, wherein the first repetition is associated with an RV value of X and X is a non-negative integer (block 1302). According to some embodiments, the wireless device may also determine that the first repetition was pre-empted from its beginning (block 1304). The wireless device then retransmits the first repetition of the UL data transmission reusing the RV value of X (block 1306). In some embodiments in which the wireless device determines that the first repetition was pre-empted from its beginning, the operations of block 1306 for retransmitting the first repetition of the UL data transmission reusing the RV value of X may comprise retransmitting the first repetition of the UL data transmission reusing the RV value of X starting from a first granted but not pre-empted symbol, responsive to the determining (block 1308).

Some embodiments may further provide that the wireless device receives a second preemption indication during a second repetition of the plurality of repetitions, wherein the second repetition is associated with the RV value of X (block 1310). The wireless device determines that the first repetition of the UL data transmission and the second repetition of the UL data transmission do not exceed a predefined percentage of a repetition associated with the RV (block 1312). In response to determining that the first repetition of the UL data transmission and the second repetition of the UL data transmission do not exceed the predefined percentage, the wireless device retransmits the UL data transmission reusing the RV value of X (block 1314).

Figure 14:
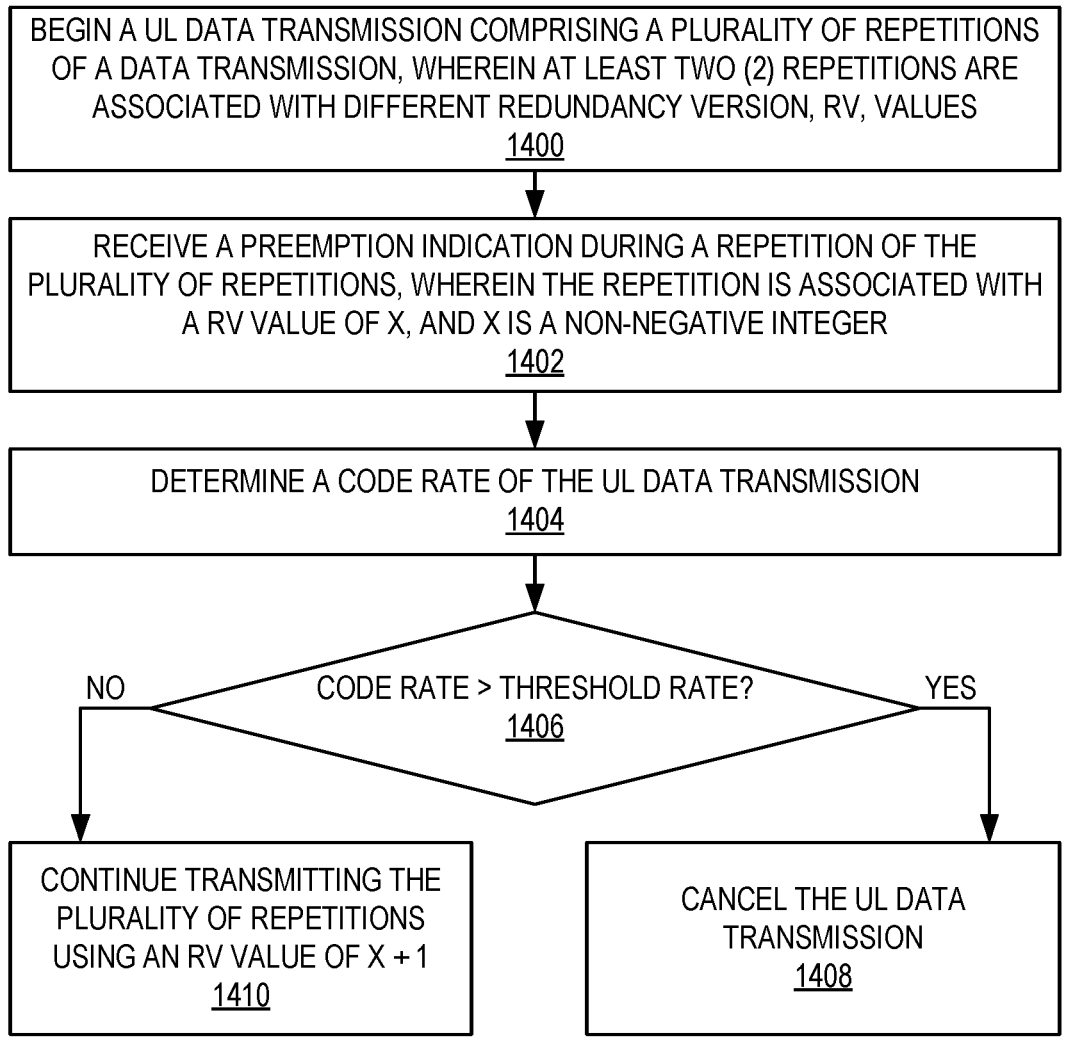
FIG. 14 is a flowchart illustrating exemplary operations for modifying UL data transmission with repetition in response to receiving a preemption indication according to some embodiments of the present disclosure.

FIG. 14 is a flow chart illustrating a more detailed exemplary method for modifying UL data transmission with repetition in response to receiving a preemption indication according to some embodiments of the present disclosure. It is to be understood that the operations illustrated in FIG. 14 correspond to the operations described above with respect to FIG. 12, as well as the embodiments illustrated in FIGS. 8 and 9. A wireless device begins a UL data transmission comprising a plurality of repetitions of a data transmission, wherein at least two (2) repetitions are associated with different RV values (block 1400). The wireless device next receives a preemption indication during a repetition of the plurality of repetitions, wherein the repetition is associated with a RV value of X, and X is a non-negative integer (block 1402). The wireless device then determines a code rate of the UL data transmission (block 1404). The wireless device determines whether the code rate of the UL data transmission exceeds a threshold rate (block 1406). If the wireless device determines at decision block 1406 that the code rate exceeds the threshold rate, the wireless device cancels the UL data transmission (block 1408). Otherwise, the wireless device continues transmitting the plurality of repetitions using an RV value of X+1 (block 1410).

Figure 15:
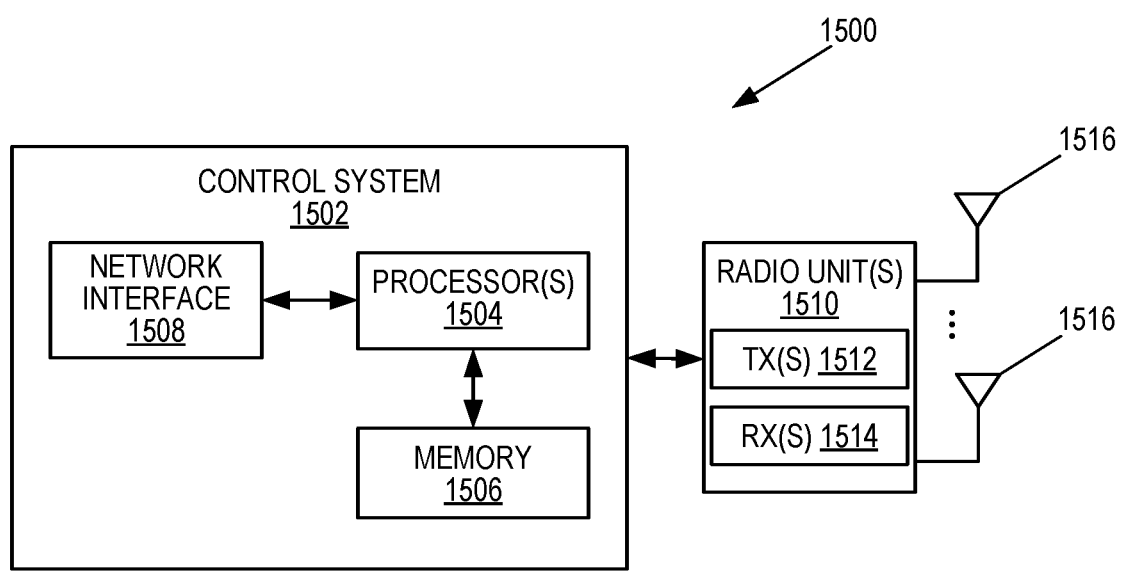
FIG. 15 is a schematic block diagram of a radio access node according to some embodiments of the present disclosure.

FIG. 15 is a schematic block diagram of a radio access node 1500 according to some embodiments of the present disclosure. The radio access node 1500 may be, for example, a base station 102 or 106 or a network node that implements all or part of the functionality of the base station 102 or gNB described herein. As illustrated, the radio access node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. In addition, the radio access node 1500 may include one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of a radio access node 1500 as described herein. In some embodiments, the function(s) are implemented in software that is stored, e.g., in the memory 1506 and executed by the one or more processors 1504.

Figure 16:
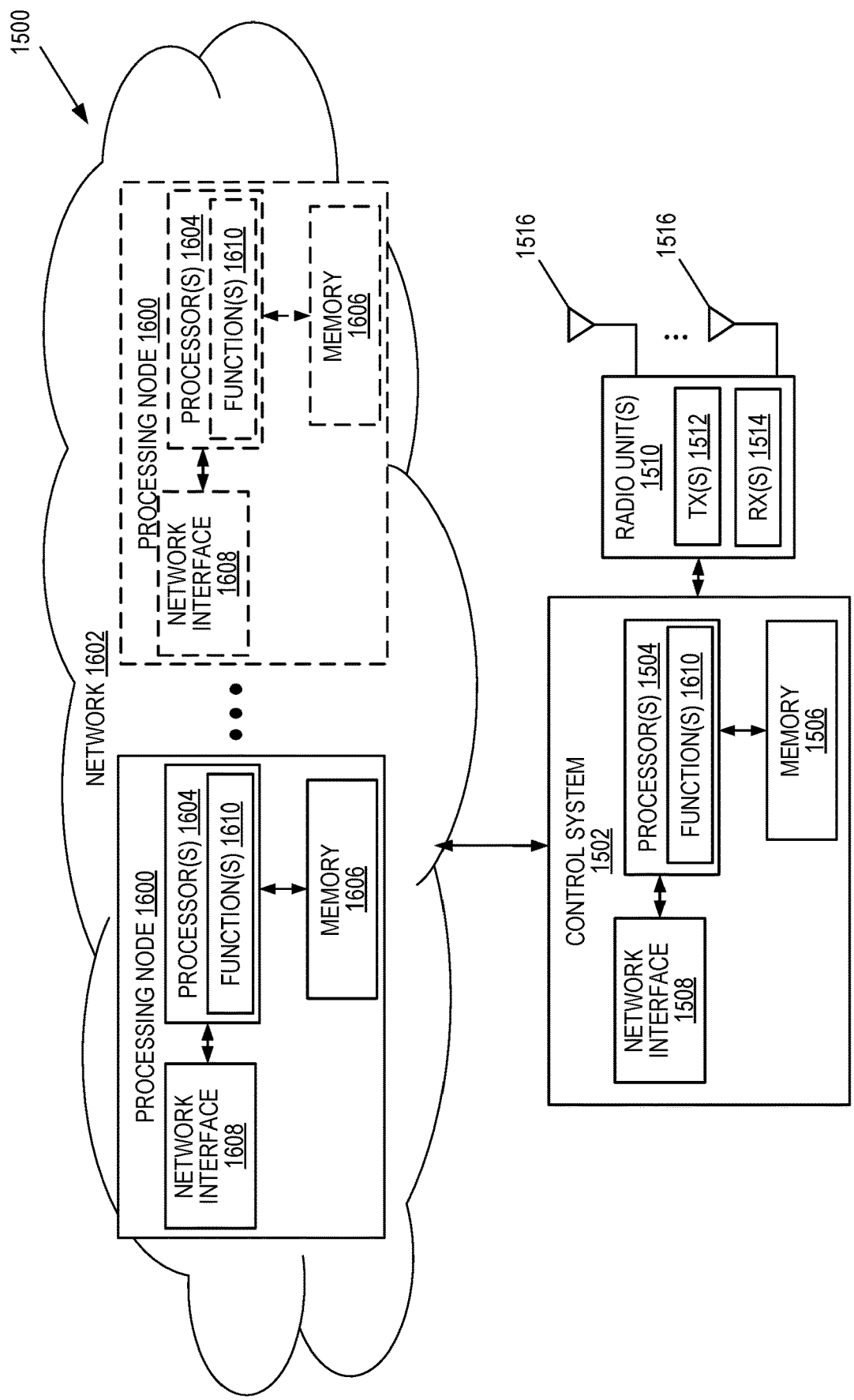
FIG. 16 is a schematic block diagram that illustrates a virtualized embodiment of the radio access node of FIG. 15 according to some embodiments of the present disclosure.

FIG. 16 is a schematic block diagram of the radio access node 1500 according to some embodiments of the present disclosure. The radio access node 1500 includes one or more modules 1600, each of which is implemented in software. The module(s) 1600 provide the functionality of the radio access node 1500 described herein. This discussion is equally applicable to the processing node 1600 of FIG. 16 where the modules 1600 may be implemented at one of the processing nodes 1600 or distributed across multiple processing nodes 1600 and/or distributed across the processing node(s) 1600 and the control system 1502.

Figure 17:
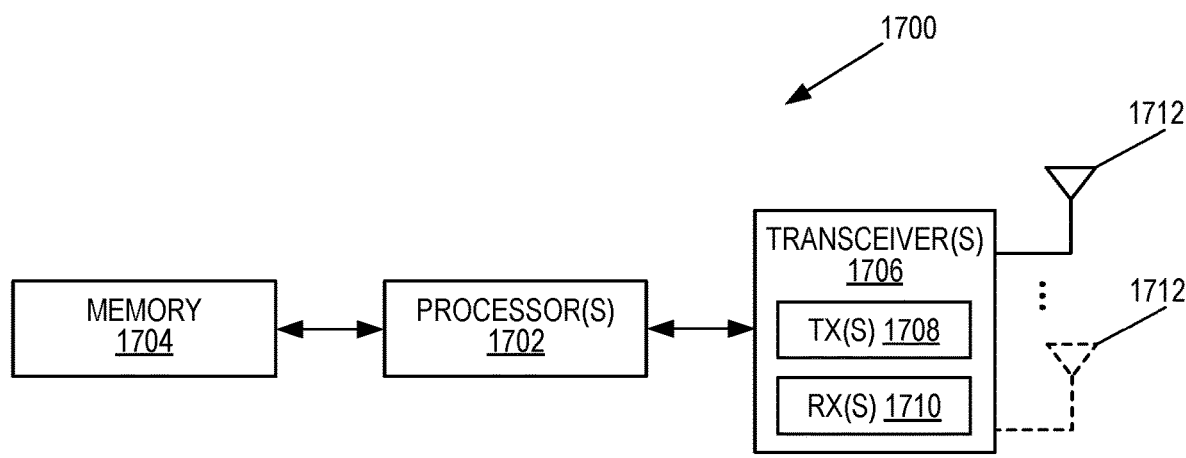
FIG. 17 is a schematic block diagram of a user equipment (UE) according to some embodiments of the present disclosure.

FIG. 17 is a schematic block diagram of a wireless communication device 1700 according to some embodiments of the present disclosure. As illustrated, the wireless communication device 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. The transceiver(s) 1706 includes radio-front end circuitry connected to the antenna(s) 1712 that is configured to condition signals communicated between the antenna(s) 1712 and the processor(s) 1702, as will be appreciated by on of ordinary skill in the art. The processors 1702 are also referred to herein as processing circuitry. The transceivers 1706 are also referred to herein as radio circuitry. In some embodiments, the functionality of the wireless communication device 1700 described above may be fully or partially implemented in software that is, e.g., stored in the memory 1704 and executed by the processor(s) 1702. Note that the wireless communication device 1700 may include additional components not illustrated in FIG. 17 such as, e.g., one or more user interface components (e.g., an input/output interface including a display, buttons, a touch screen, a microphone, a speaker(s), and/or the like and/or any other components for allowing input of information into the wireless communication device 1700 and/or allowing output of information from the wireless communication device 1700), a power supply (e.g., a battery and associated power circuitry), etc.

In some embodiments, a computer program including instructions which, when executed by at least one processor, causes the at least one processor to carry out the functionality of the wireless communication device 1700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
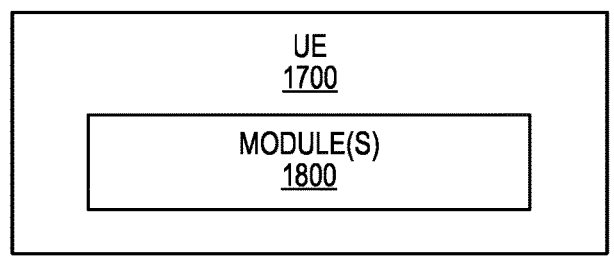
FIG. 18 is a schematic block diagram of the UE of FIG. 17 according to some other embodiments of the present disclosure.

FIG. 18 is a schematic block diagram of the wireless communication device 1700 according to some other embodiments of the present disclosure. The wireless communication device 1700 includes one or more modules 1800, each of which is implemented in software. The module(s) 1800 provide the functionality of the wireless communication device 1700 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.). While not being limited thereto, some example embodiments of the present disclosure are provided below.

Embodiment 1: A method, performed by a wireless device, for modifying uplink, UL, data transmission with repetition in response to receiving a preemption indication, the method comprising:
  beginning a UL data transmission comprising a plurality of repetitions of a data transmission, wherein at least two (2) repetitions are associated with different Redundancy Version, RV, values;
  receiving a first preemption indication during a first repetition of the plurality of repetitions, wherein the first repetition is associated with a RV value of X, and X is a positive integer; and
  retransmitting the first repetition of the UL data transmission reusing the RV value of X.

Embodiment 2: The method of embodiment 1, further comprising:
  receiving a second preemption indication during a second repetition of the plurality of repetitions, wherein the second repetition is associated with the RV value of X;
  determining that the first repetition of the UL data transmission and the second repetition of the data transmission do not exceed a predefined percentage of a repetition associated with the RV; and
  responsive to the determining, retransmitting the data transmission reusing the RV value of X.

Embodiment 3: The method of embodiment 1, further comprising determining that the first repetition was pre-empted from its beginning;
  wherein retransmitting the first repetition of the UL data transmission comprises retransmitting the first repetition of the UL data transmission reusing the RV value of X starting from a first granted but not pre-empted symbol, responsive to the determining.

Embodiment 4: A wireless device, adapted to:
  begin an uplink, UL, data transmission comprising a plurality of repetitions of a data transmission, wherein at least two (2) repetitions are associated with different Redundancy Version, RV, values;
  receive a first preemption indication during a first repetition of the plurality of repetitions, wherein the first repetition is associated with a RV value of X, and X is a positive integer; and
  retransmit the first repetition of the UL data transmission reusing the RV value of X.

Embodiment 5: The wireless device of embodiment 4, further adapted to perform the method of any one of embodiments 2 and 3.

Embodiment 6: A wireless device, comprising
  one or more transmitters;
  one or more receivers; and
  processing circuitry associated with the one or more transmitters and the one or more receivers, the processing circuitry configured to cause the wireless device to:
    begin a UL data transmission comprising a plurality of repetitions of a data transmission, wherein at least two (2) repetitions are associated with different Redundancy Version, RV, values;
    receive a first preemption indication during a first repetition of the plurality of repetitions, wherein the first repetition is associated with a RV value of X, and X is a positive integer; and
    retransmit the first repetition of the UL data transmission reusing the RV value of X.

Embodiment 7: The wireless device of embodiment 6, wherein the processing circuitry is further configured to cause the wireless device to perform the method of any one of embodiments 2 and 3.

Embodiment 8: A method, performed by a wireless device, for modifying uplink, UL, data transmission with repetition in response to receiving a preemption indication, the method comprising:
  beginning a UL data transmission comprising a first plurality of repetitions of a first data transmission, wherein at least two (2) repetitions are associated with different Redundancy Version, RV, values;
  receiving a first preemption indication during a first repetition of the first plurality of repetitions, wherein the first repetition is associated with a RV value of X, and X is a positive integer;
  determining a code rate of the first data transmission;
  determining that the code rate of the first data transmission exceeds a threshold rate; and
  responsive to determining that the code rate of the first data transmission exceeds the threshold rate, cancelling the first data transmission.

Embodiment 9: The method of embodiment 8, further comprising:

beginning a UL data transmission comprising a second plurality of repetitions of a second data transmission, wherein at least two (2) repetitions are associated with different RV values;

receiving a second preemption indication during a second repetition of the second plurality of repetitions, wherein the second repetition is associated with a RV value of X and X is a positive integer;

determining a code rate of the second data transmission;

determining that the code rate of the second data transmission does not exceed the threshold rate; and responsive to determining that the code rate of the second data transmission does not exceed the threshold rate, continuing transmitting the second plurality of repetitions using an RV value of X+1.

Embodiment 10: A wireless device, adapted to:

begin an uplink, UL, data transmission comprising a first plurality of repetitions of a first data transmission, wherein at least two (2) repetitions are associated with different Redundancy Version, RV, values;

receive a first preemption indication during a first repetition of the first plurality of repetitions, wherein the first repetition is associated with a RV value of X and X is a positive integer;

determine a code rate of the first data transmission;

determine that the code rate of the first data transmission exceeds a threshold rate; and responsive to determining that the code rate of the first data transmission exceeds the threshold rate, cancel the first data transmission.

Embodiment 11: The wireless device of embodiment 10, further adapted to perform the method of embodiment 8.

Embodiment 12: A wireless device, comprising one or more transmitters;

one or more receivers; and processing circuitry associated with the one or more transmitters and the one or more receivers, the processing circuitry configured to cause the wireless device to:

begin an uplink, UL, data transmission comprising a first plurality of repetitions of a first data transmission, wherein at least two (2) repetitions are associated with different Redundancy Version, RV, values;

receive a first preemption indication during a first repetition of the first plurality of repetitions, wherein the first repetition is associated with a RV value of X and X is a positive integer;

determine a code rate of the first data transmission;

determine that the code rate of the first data transmission exceeds a threshold rate; and responsive to determining that the code rate of the first data transmission exceeds the threshold rate, cancel the first data transmission.

Embodiment 13: The wireless device of embodiment 12, wherein the processing circuitry is further configured to cause the wireless device to perform the method of embodiment 8.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5GC Fifth Generation Core
5GS Fifth Generation System
AF Application Function
AN Access Network
CI Cancellation Indication
DN Data Network
eMBB Enhanced Mobile Broadband
eNB Enhanced or Evolved Node B
E-UTRA Evolved Universal Terrestrial Radio Access
FPGA Field Programmable Gate Array
gNB New Radio Base Station
HSS Home Subscriber Server
IoT Internet of Things
IP Internet Protocol
MCS Modulation and Coding Scheme
MME Mobility Management Entity
MTC Machine Type Communication
NEF Network Exposure Function
OFDM Orthogonal Frequency-Division Multiplexing
PC Personal Computer
PCF Policy Control Function
P-GW Packet Data Network Gateway
PI Preemption Indication
PRB Physical Resource Block
PSD Power Spectral Density
PUSCH Physical Uplink Shared Channel
QoS Quality of Service
RAM Random Access Memory
RAN Radio Access Network
Rel-15 Release 15
Rel-16 Release 16
ROM Read Only Memory
RRH Remote Radio Head
RTT Round Trip Time
RV Redundancy Version
SCEF Service Capability Exposure Function
SINR Signal to Interference and Noise Ratio
SMF Session Management Function
TS Technical Specification
UDM Unified Data Management
UL Uplink
URLLC Ultra-Reliable and Low Latency Communication
UPF User Plane Function Those skilled in the art will recognize improvements and modifications to the embodiments of the present disclosure. All such improvements and modifications are considered within the scope of the concepts disclosed herein.

What is claimed is:

1. A method, performed by a wireless device, for modifying uplink, UL, data transmission with repetition in response to receiving a preemption indication, the method comprising:

beginning a UL data transmission comprising a plurality of repetitions of a data transmission, wherein at least two (2) repetitions are associated with different Redundancy Version, RV, values;

receiving a first preemption indication during a first repetition of the plurality of repetitions, wherein the first repetition is associated with a RV value of X, and X is a positive integer;

based on the first preemption indication, preempting the transmission of the first repetition to free up at least one resource;

after preempting the transmission of the first repetition and when the at least one resource is available again, retransmitting the first repetition of the UL data transmission that was preempted as a second repetition of the UL data transmission, wherein transmission of the second repetition reuses the RV value of X;

receiving a second preemption indication during transmission of the second repetition of the plurality of repetitions;

determining that the first repetition of the UL data transmission and the second repetition of the UL data transmission do not exceed a predefined percentage of a repetition associated with the RV; and responsive to the determining, retransmitting the UL data transmission reusing the RV value of X.

2. The method of claim 1, further comprising determining that the first repetition was pre-empted from its beginning; wherein retransmitting the first repetition of the UL data transmission comprises retransmitting the first repetition of the UL data transmission reusing the RV value of X starting from a first granted but not pre-empted symbol, responsive to the determining.

3. A wireless device, adapted to:
begin an uplink, UL, data transmission comprising a plurality of repetitions of a data transmission, wherein at least two (2) repetitions are associated with different Redundancy Version, RV, values;
receive a first preemption indication during a first repetition of the plurality of repetitions, wherein the first repetition is associated with a RV value of X, and X is a positive integer;
based on the first preemption indication, preempt the transmission of the first repetition to free up at least one resource;
after preempting the transmission of the first repetition and when the at least one resource is available again, retransmit the first repetition of the UL data transmission that was preempted reusing the RV value of X as a second repetition of the UL data transmission, wherein transmission of the second repetition reuses the RV value of X;
receive a second preemption indication during transmission of the second repetition of the plurality of repetitions;
determine that the first repetition of the UL data transmission and the second repetition of the UL data transmission do not exceed a predefined percentage of a repetition associated with the RV; and
responsive to the determining, retransmit the UL data transmission reusing the RV value of X.

4. A wireless device, comprising
one or more transmitters;
one or more receivers; and
processing circuitry associated with the one or more transmitters and the one or more receivers, the processing circuitry configured to cause the wireless device to:
begin UL data transmission comprising a plurality of repetitions of a data transmission, wherein at least two (2) repetitions are associated with different Redundancy Version, RV, values;
receive a first preemption indication during a first repetition of the plurality of repetitions, wherein the first repetition is associated with a RV value of X, and X is a positive integer;
based on the first preemption indication, preempt the transmission of the first repetition to free up at least one resource; and
after preempting the transmission of the first repetition and when the at least one resource is available again, retransmit the first repetition of the UL data transmission that was preempted as a second repetition of the UL data transmission, wherein transmission of the second repetition reuses the RV value of X;
receive a second preemption indication during transmission of the second repetition of the plurality of repetitions;

determine that the first repetition of the UL data transmission and the second repetition of the UL data transmission do not exceed a predefined percentage of a repetition associated with the RV; and
responsive to the determining, retransmit the UL data transmission reusing the RV value of X.

5. A method, performed by a wireless device, for modifying uplink, UL, data transmission with repetition in response to receiving a preemption indication, the method comprising:
beginning UL data transmission comprising a first plurality of repetitions of a first data transmission, wherein at least two (2) repetitions are associated with different Redundancy Version, RV, values;
receiving a first preemption indication during a first repetition of the first plurality of repetitions, wherein the first repetition is associated with a RV value of X, and X is a positive integer;
determining a code rate of the first data transmission;
determining that the code rate of the first data transmission exceeds a threshold rate; and
responsive to determining that the code rate of the first data transmission exceeds the threshold rate, cancelling the first data transmission.

6. The method of claim 5, further comprising:
beginning UL data transmission comprising a second plurality of repetitions of a second data transmission, wherein at least two (2) repetitions are associated with different RV values;
receiving a second preemption indication during a second repetition of the second plurality of repetitions, wherein the second repetition is associated with a RV value of X and X is a positive integer;
determining a code rate of the second data transmission;
determining that the code rate of the second data transmission does not exceed the threshold rate; and
responsive to determining that the code rate of the second data transmission does not exceed the threshold rate, continuing transmitting the second plurality of repetitions using an RV value of X+1.

7. A wireless device, adapted to:
begin an uplink, UL, data transmission comprising a first plurality of repetitions of a first data transmission, wherein at least two (2) repetitions are associated with different Redundancy Version, RV, values;
receive a first preemption indication during a first repetition of the first plurality of repetitions, wherein the first repetition is associated with a RV value of X and X is a positive integer;
determine a code rate of the first data transmission;
determine that the code rate of the first data transmission exceeds a threshold rate; and
responsive to determining that the code rate of the first data transmission exceeds the threshold rate, cancel the first data transmission.

8. The wireless device of claim 7, further adapted to:
begin UL data transmission comprising a second plurality of repetitions of a second data transmission, wherein at least two (2) repetitions are associated with different RV values;
receive a second preemption indication during a second repetition of the second plurality of repetitions, wherein the second repetition is associated with a RV value of X and X is a positive integer;
determine a code rate of the second data transmission;
determine that the code rate of the second data transmission does not exceed the threshold rate; and responsive to determining that the code rate of the second data transmission does not exceed the threshold rate, continue transmitting the second plurality of repetitions using an RV value of X+1.

9. A wireless device, comprising
one or more transmitters;
one or more receivers; and
processing circuitry associated with the one or more transmitters and the one or more receivers, the processing circuitry configured to cause the wireless device to:
begin an uplink, UL, data transmission comprising a first plurality of repetitions of a first data transmission, wherein at least two (2) repetitions are associated with different Redundancy Version, RV, values;
receive a first preemption indication during a first repetition of the first plurality of repetitions, wherein the first repetition is associated with a RV value of X and X is a positive integer;
determine a code rate of the first data transmission;
determine that the code rate of the first data transmission exceeds a threshold rate; and
responsive to determining that the code rate of the first data transmission exceeds the threshold rate, cancel the first data transmission.

10. The wireless device of claim 9, wherein the processing circuitry is further configured to cause the wireless device to:
begin UL data transmission comprising a second plurality of repetitions of a second data transmission, wherein at least two (2) repetitions are associated with different RV values;
receive a second preemption indication during a second repetition of the second plurality of repetitions, wherein the second repetition is associated with a RV value of X and X is a positive integer;
determine a code rate of the second data transmission;
determine that the code rate of the second data transmission does not exceed the threshold rate; and
responsive to determining that the code rate of the second data transmission does not exceed the threshold rate, continue transmitting the second plurality of repetitions using an RV value of X+1.

\* \* \* \* \*